(12) United States Patent
Cadima

(10) Patent No.: US 11,473,781 B2
(45) Date of Patent: *Oct. 18, 2022

(54) COOKTOP APPLIANCE TEMPERATURE SENSOR WITH TRANSIENT TEMPERATURE CORRECTION

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/910,817

(22) Filed: Jun. 24, 2020

(65) Prior Publication Data

US 2021/0404666 A1 Dec. 30, 2021

(51) Int. Cl.
*F24C 3/12* (2006.01)
*F24C 3/00* (2006.01)
*G01K 13/00* (2021.01)
*F23D 14/72* (2006.01)
*F24C 3/08* (2006.01)

(52) U.S. Cl.
CPC .............. *F24C 3/126* (2013.01); *F24C 3/008* (2013.01); *G01K 13/00* (2013.01); *F23D 14/72* (2013.01); *F24C 3/085* (2013.01)

(58) Field of Classification Search
CPC ..... F23N 2225/16; F24C 15/107; F24C 3/085
USPC ........... 126/39 E, 39 J, 39 K, 39 R, 39 N, 42
See application file for complete search history.

(56) References Cited

U.S. PATENT DOCUMENTS

2021/0404885 A1* 12/2021 Cadima ................. F24C 15/107

* cited by examiner

*Primary Examiner* — Vivek K Shirsat
(74) *Attorney, Agent, or Firm* — Dority & Manning, P.A.

(57) ABSTRACT

A cooktop appliance includes a gas burner, a user input configured to define a power setting of the gas burner, and a grate. The grate includes a sensor finger with a temperature sensor mounted thereto. The temperature sensor includes a first temperature probe extending above a top surface of the sensor finger and a second temperature probe positioned within the sensor finger. The cooktop appliance also includes a controller in communication with the temperature sensor. The temperature sensor is configured to transmit a first temperature measurement from the first temperature probe and a second temperature measurement from the second temperature probe to the controller. The controller is configured to determine a temperature of a cooking utensil positioned on the top surface of the sensor finger based on the power setting defined by the user input, the first temperature measurement, and the second temperature measurement.

18 Claims, 14 Drawing Sheets

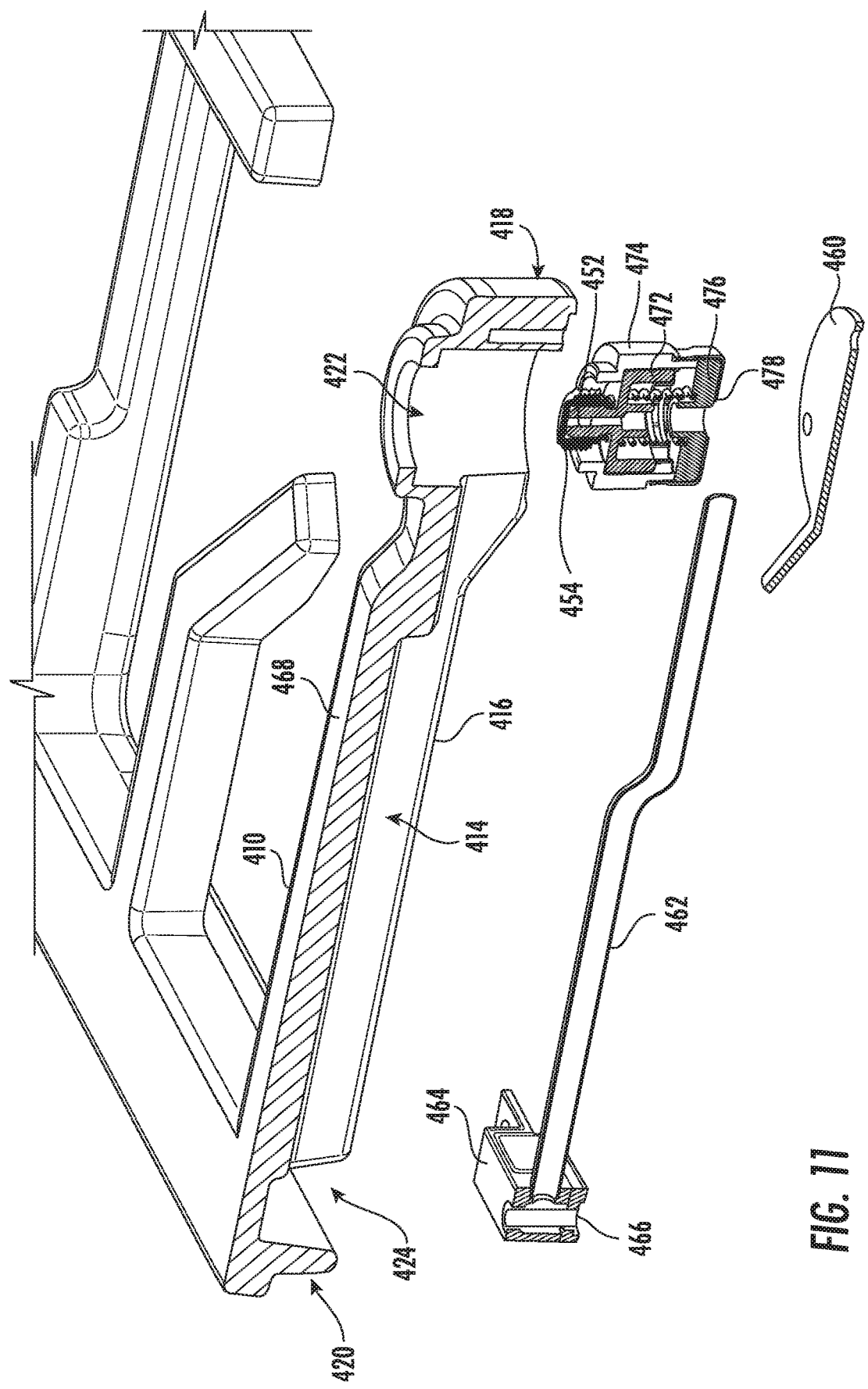

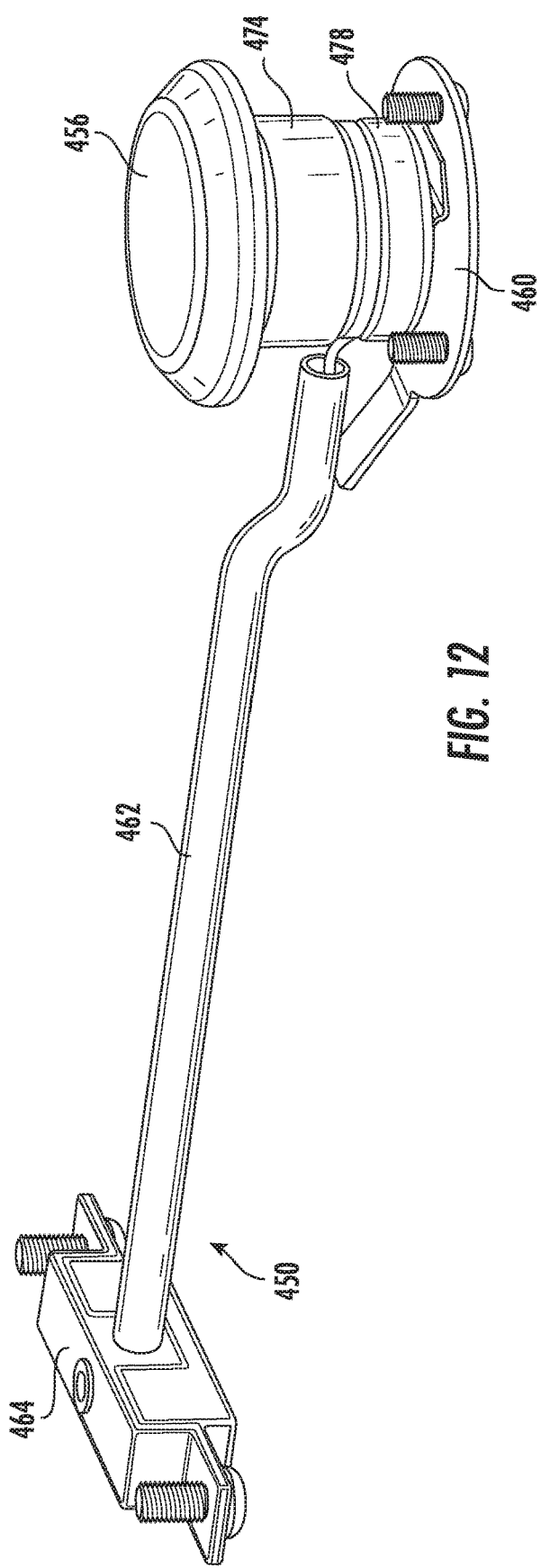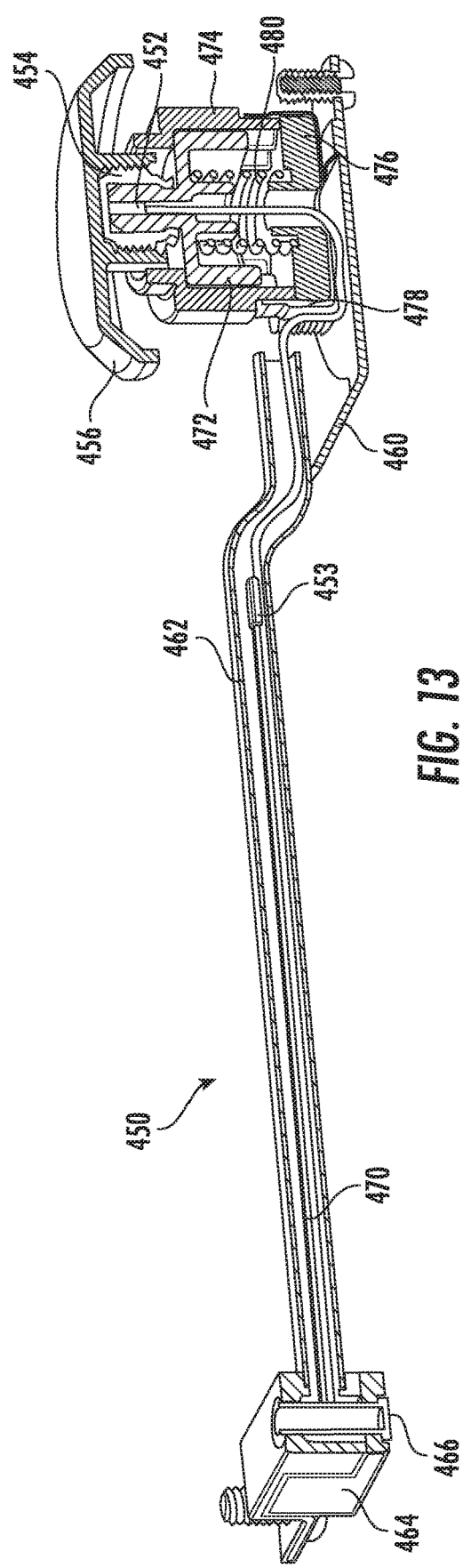

COOKTOP APPLIANCE TEMPERATURE SENSOR WITH TRANSIENT TEMPERATURE CORRECTION

FIELD OF THE INVENTION

The present subjection matter relates generally to cooktop appliances, such as cooktop appliances with grates having embedded sensors therein for sensing temperatures of cooking utensils on the grates.

BACKGROUND OF THE INVENTION

Cooking appliances, e.g., cooktops or ranges (also known as hobs or stoves), generally include one or more heated portions for heating or cooking food items within or on a cooking utensil placed on the heated portion. For instance, burners may be included with each heated portion. The heated portions utilize one or more heating sources to output heat, which is transferred to the cooking utensil and thereby to any food item or items that are disposed on or within the cooking utensil.

Gas cooktop appliances generally include a plurality of gas burners mounted at a top surface of the appliance. Gas burners heat a cooking utensil positioned on a grate over the gas burner primarily via convective heating. Thus, measuring cooking utensil temperatures on gas cooktop appliances poses challenges because any sensor that contacts the cooking utensil is significantly heated by swirling heated air from the gas burner. Mounting a utensil temperature sensor within the grate provides a convenient location for a temperature sensor that is unobtrusive during cooking, however, because the grate is also heated by the convective heat source, such mounting also introduces challenges in the temperature measurement due to heat transfer from the grate to the sensor.

Some gas cooktops include a spring-loaded sensor that passes through the gas burner and presses against the cookware on the grate. Such spring-loaded sensors have drawbacks. For example, assembly and cleaning of burner parts is greatly complicated due to the construction of the gas burner that includes a moveable sensor passing through the gas burner. As another example, openings in the gas burner and other cooktop components that accommodate the spring-loaded sensors undesirably pass spills through the gas burner.

Accordingly, a gas cooktop appliance with features for accurately sensing temperatures of cookware thereon would be useful.

BRIEF DESCRIPTION OF THE INVENTION

Aspects and advantages of the invention will be set forth in part in the following description, or may be obvious from the description, or may be learned through practice of the invention.

In one aspect of the present disclosure, a cooktop appliance is provided. The cooktop appliance includes a gas burner disposed on a panel of the cooktop appliance, a user input configured to define a power setting of the gas burner, and a grate with a plurality of fingers positioned above the gas burner. The plurality of fingers includes a sensor finger. A temperature sensor is mounted to the sensor finger of the plurality of fingers of the grate. The temperature sensor includes a first temperature probe extending above a top surface of the sensor finger at a first end portion of the sensor finger and a second temperature probe positioned within the sensor finger between the top surface of the sensor finger and a bottom surface of the sensor finger. The cooktop appliance also includes a controller in communication with the temperature sensor. The temperature sensor is configured to transmit a first temperature measurement from the first temperature probe and a second temperature measurement from the second temperature probe to the controller. The controller is configured to determine a temperature of a cooking utensil positioned on the top surface of the sensor finger based on the power setting defined by the user input, the first temperature measurement, and the second temperature measurement.

In another aspect of the present disclosure, a method of measuring a temperature of a cooking utensil on a cooktop appliance is provided. The cooktop appliance includes a gas burner disposed on a panel of the cooktop appliance and a grate with a plurality of fingers positioned above the gas burner. The plurality of fingers includes a sensor finger. A temperature sensor is mounted to the sensor finger of the plurality of fingers of the grate. The temperature sensor includes a first temperature probe extending above a top surface of the sensor finger at a first end portion of the sensor finger and a second temperature probe positioned within the sensor finger between the top surface of the sensor finger and a bottom surface of the sensor finger. The cooking utensil is positioned on the top surface of the sensor finger. The method includes receiving a power setting for the gas burner from a user input of the cooktop appliance. The method also includes measuring a first temperature with the first temperature probe and measuring a second temperature with the second temperature probe. The method further includes determining the temperature of the cooking utensil based on the power setting, the first temperature measurement, and the second temperature measurement.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 11 provides an exploded sectional view of a sensor finger according to one or more example embodiments of the present disclosure.

FIG. 12 provides a perspective view of an exemplary temperature sensor as may be incorporated into a cooktop appliance according to one or more embodiments of the present disclosure.

FIG. 13 provides a section view of the temperature sensor of FIG. 10.

DETAILED DESCRIPTION

Figure 1:
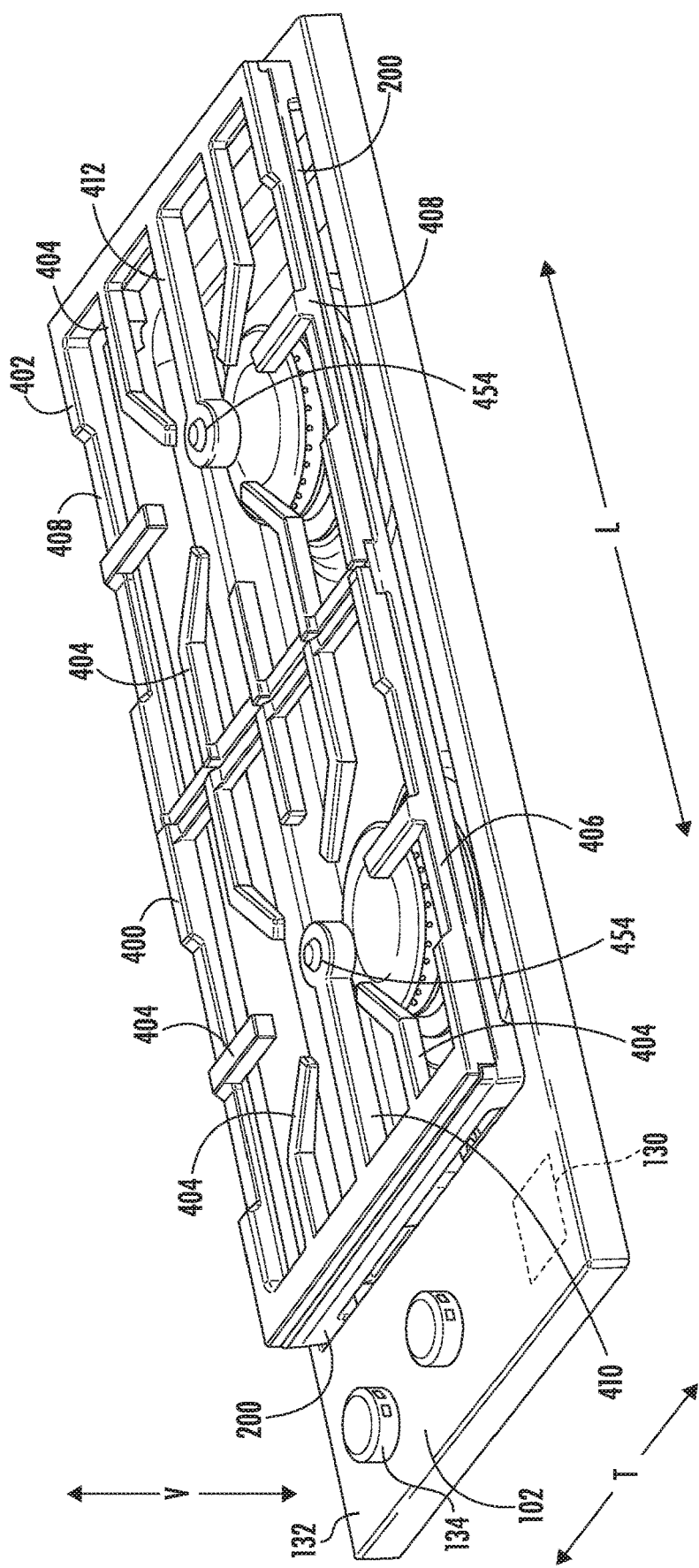
FIG. 1 provides a perspective view of a cooktop appliance according to one or more example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
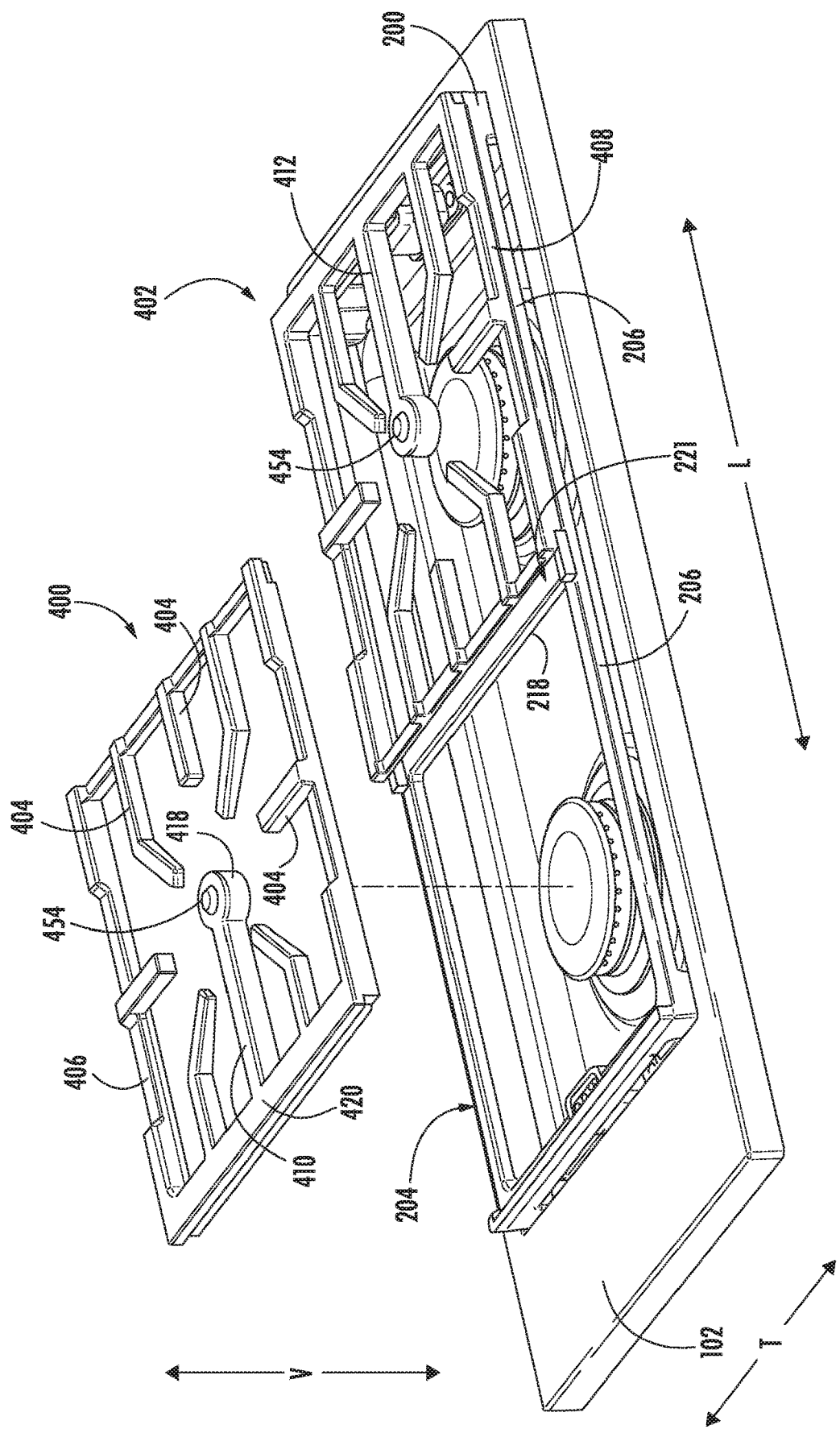
FIG. 2 provides a partially exploded view of the example cooktop appliance of FIG. 1.
Figure 3:
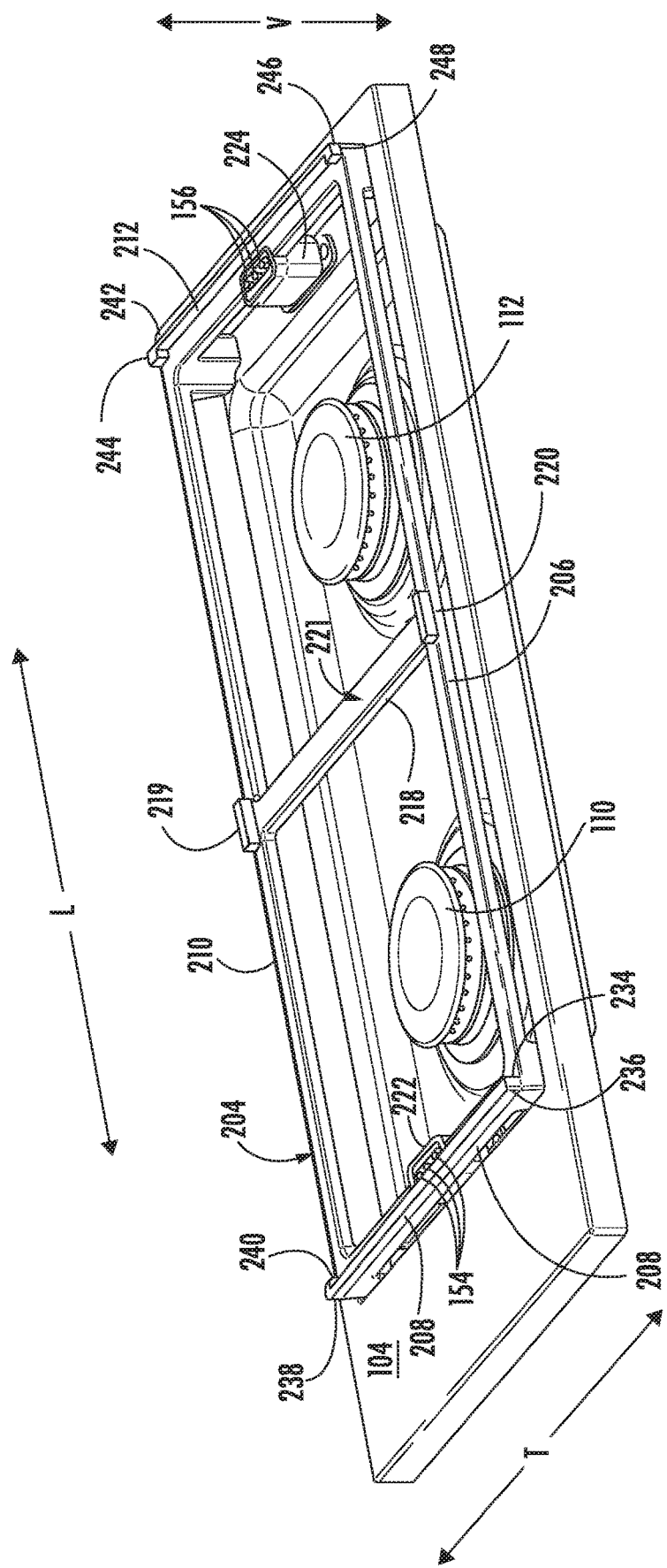
FIG. 3 provides a perspective view of the example cooktop appliance of FIG. 1 with the grates removed.
Figure 4:
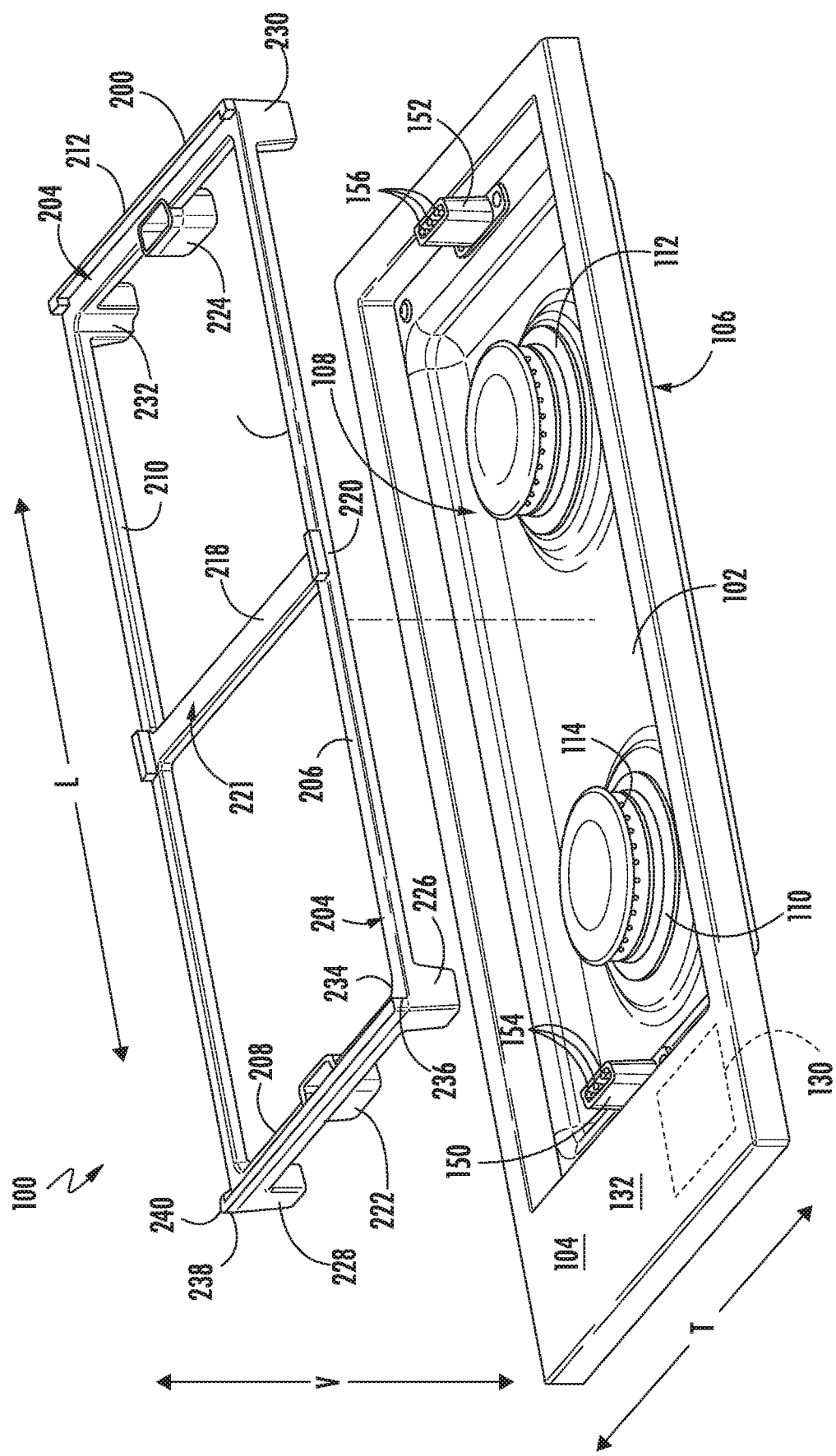
FIG. 4 provides a partially exploded view of the example cooktop appliance of FIG. 3.
Figure 5:
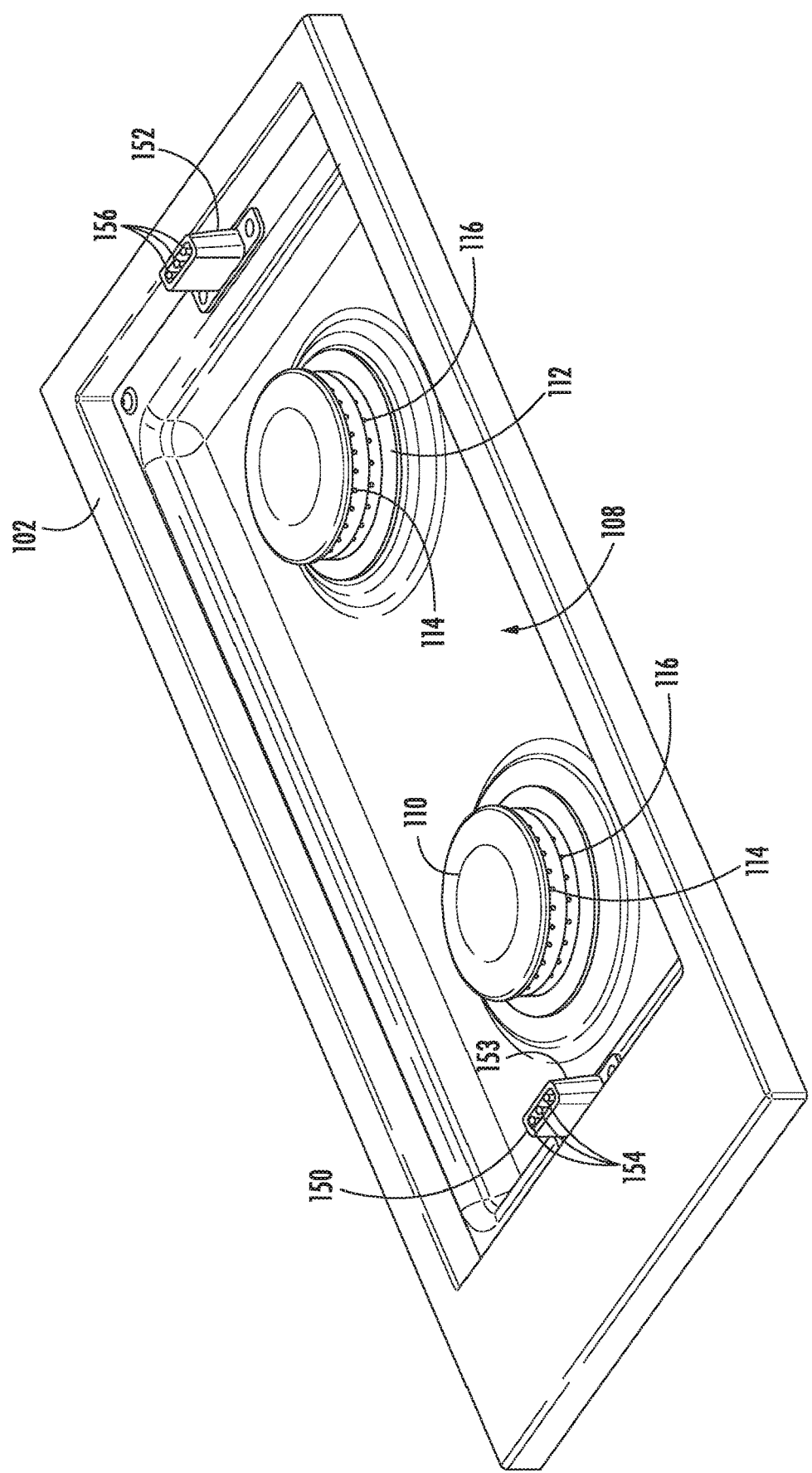
FIG. 5 provides a perspective view of a top panel with a burner and a pogo pin terminal block disposed thereon, such as may be incorporated into a cooktop appliance according to one or more embodiments of the present disclosure.

FIGS. 1 through 5 illustrate an exemplary a cooktop appliance 100 according to one or more example embodiments of the present disclosure. The example cooktop appliance 100 includes a panel 102 that extends in a lateral direction L and a transverse direction T, e.g., perpendicular to a vertical direction V. Each of the vertical direction V, lateral direction L, and transverse direction T is mutually perpendicular with every other of the vertical direction V, the lateral direction L, and the transverse direction T, such that an orthogonal direction system is formed. More particularly, FIG. 1 depicts the exemplary cooktop appliance 100 with a frame 200 mounted on the panel 102 and a pair of grates 400, 402 mounted on the frame 200, while FIG. 2 depicts the exemplary cooktop appliance 100 with the first grate 400 lifted off of the frame 200, and FIG. 3 depicts the panel 102 and frame 200 with both grates 400 and 402 of the pair of grates 400, 402 removed. FIG. 4 depicts the exemplary cooktop appliance 100 with the frame 200 lifted off of the panel 102, and FIG. 5 depicts the panel 102 with the frame 200 and grates 400, 402 all removed. The panel 102 may include a top surface 104 and a bottom surface 106. By way of example, the panel 102 may be constructed of enameled steel, stainless steel, glass, ceramics, and combinations thereof.

As may be seen, e.g., in FIGS. 1 through 5, the cooktop appliance 100 may include a plurality of burners. For example, the cooktop appliance 100 may include a first burner 110 disposed on the panel 102 and a second burner 112 spaced apart from the first burner 110 on the panel 102. For example, as illustrated, the first burner 110 and the second burner 112 may be aligned along the transverse direction T and spaced apart along the lateral direction L. The panel 102 may also include a recessed portion 108, e.g., which extends downward along the vertical direction V. The first and second burners 110 and 112 may be positioned within the recessed portion 108. The recessed portion 108 may collect spilled material, e.g., foodstuffs, during operation of the cooktop appliance.

The cooktop appliance 100 may also include a user interface panel 132 located within convenient reach of a user of the cooktop appliance 100. In various embodiments, the user interface panel 132 may include user inputs 134, such as knobs, buttons, or a touchscreen, etc., which are generally understood by those of ordinary skill in the art and are therefore not shown or described in extensive detail herein for the sake of brevity and clarity. The user inputs 134 may allow the user to activate one or more burners and determine an amount of heat provided by each gas burner. The user interface panel 132 may also be provided with one or more graphical display devices that deliver certain information to the user, e.g., whether a particular burner is activated and/or the output level at which the burner is set.

Operation of the cooktop appliance 100 can be regulated by a controller 130 that is operably coupled to (i.e., in operative communication with) the user inputs and/or gas burners. For example, in response to user manipulation of the user input(s), the controller 130 operates one or more of the burners 110, 112. By way of example, the controller 130 may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In some embodiments, the processor may execute programming instructions stored in non-transitory memory. For example, the instructions may include a software package configured to operate appliance 100 and execute an operation routine such as one or more methods of operating the cooktop appliance 100. The memory may be a separate component from the processor or may be included onboard within the processor. The controller 130 may be programmed to operate the cooktop appliance 100 by executing instructions stored in memory. For example, the instructions may be software or any set of instructions that when executed by the processing device, cause the processing device to perform operations. Controller 130 may be configured to perform a variety of computer-implemented functions and/or instructions (e.g. performing the methods, steps, calculations and the like and storing relevant data as disclosed herein). It should be noted that controllers 130 as disclosed herein are capable of and may be operable to perform any methods and associated method steps as disclosed herein.

The controller 130 may be disposed in a variety of locations throughout appliance 100. Input/output ("I/O") signals may be routed between the controller 130 and various operational components of appliance 100, such as the gas burners 110, 112, inputs, a graphical display, one or more sensors, and/or one or more alarms.

Generally, each gas burner 110, 112 includes a generally circular shape from which a flame may be emitted. As shown, each gas burner 110, 112 includes a plurality of fuel ports 114 defined circumferentially therearound. Each fuel port 114 is in fluid communication with an internal passage of each respective burner 110, 112. In some embodiments, e.g., as illustrated in FIG. 5, one or both of the first burner 110 and the second burner 112 may be a multi-ring burner. For example, as illustrated in FIG. 5, the first burner 110 may include a first plurality of fuel ports 114 defining a first ring of the burner 110 and a second plurality of fuel ports 116 defining a second ring of the burner 110. In such embodiments, a first fuel chamber in fluid communication with the first plurality of fuel ports 114 may be separated from a second fuel chamber in fluid communication with the second plurality of fuel ports 116 by a wall within the burner 110, and the burner may be configured to selectively supply fuel to one or both of the fuel chambers. In some embodiments of a cooktop appliance, multiple burners of differing types may be provided in combination, e.g., one or more single-ring burners as well as one or more multi-ring burners. Moreover, other suitable burner configurations are also possible.

The controller 130 may be in operative communication with one or more temperature sensors. For example, as will be described in more detail below, the controller 130 may be selectively in operative communication with one or more embedded temperature sensors 450 in one or more grates 400, 402 via pogo pin terminal blocks positioned on, e.g., mounted to, the panel 102. In some embodiments, the cooktop appliance 100 may therefore include a first pogo pin terminal block 150 and a second pogo pin terminal block 152.

Figure 6:
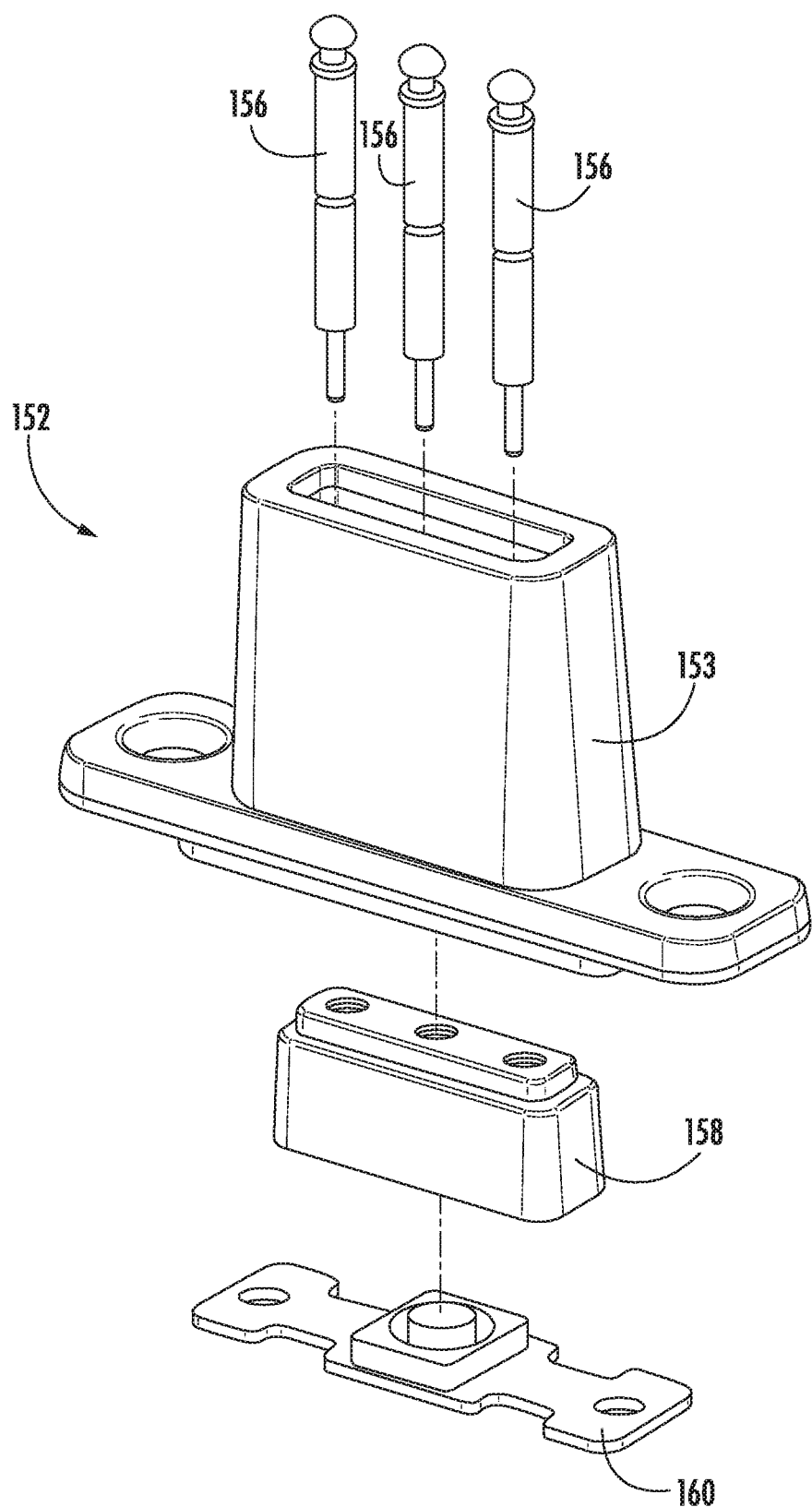
FIG. 6 provides an exploded view of a pogo pin terminal block such as may be incorporated into a cooktop appliance according to one or more embodiments of the present disclosure.
Figure 7:
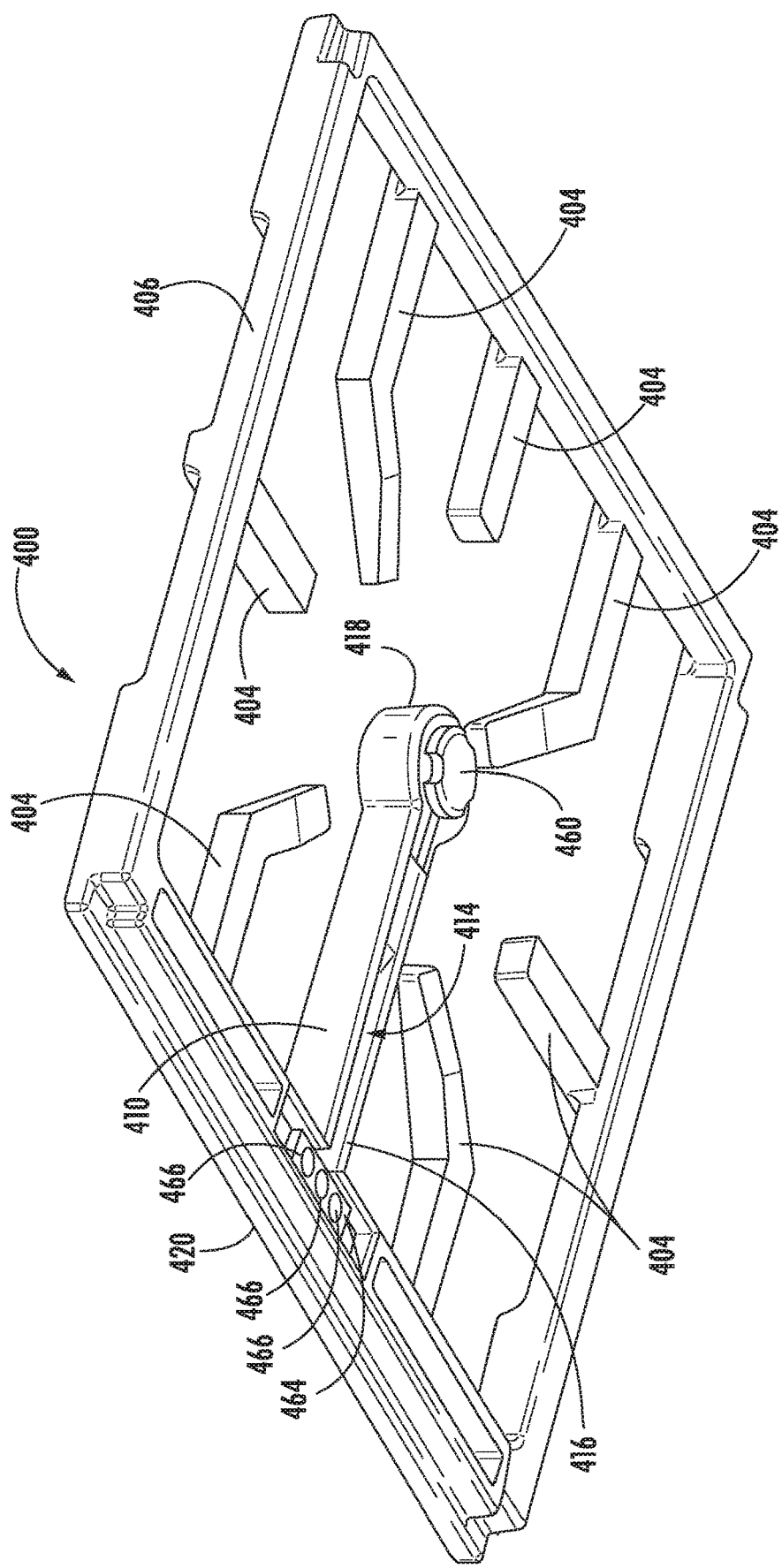
FIG. 7 provides a perspective view of an example grate having an embedded temperature sensor therein as may be incorporated into a cooktop appliance in one or more example embodiments of the present disclosure.

As best seen in FIGS. 5 and 6, the first and second connectors 154 and 156 of the first pogo pin terminal block 150 and second pogo pin terminal block 152 may be positioned in a housing 153 mounted on the panel 102, e.g., where the housing 153 is on and extending from the top surface 104 of the panel 102, such that the housing 153 elevates the respective connectors 154, 156 of each pogo pin terminal block 150 or 152 above the top surface 104 of the panel 102 and away from the recessed portion 108 where spills collect. Also as illustrated in FIG. 6, each pogo pin terminal block 150, 152 may include a connector block 158 and a baseplate 160. Only the second pogo pin terminal block 152 is illustrated in FIG. 6, although it should be understood that the first and second pogo pin terminal blocks 150 and 152 are substantially identical, e.g., apart from their respective locations.

In some embodiments, the first pogo pin terminal block 150 may be positioned on the panel 102 adjacent to the first burner 110 and the second pogo pin terminal block 152 may be positioned on the panel 102 adjacent to the second burner 112. For example, the first pogo pin terminal block 150 may be positioned opposite the second burner 112, e.g., about the first burner 110, along the lateral direction L, and the second pogo pin terminal block 152 may be positioned opposite the first burner 110, e.g., about the second burner 112, along the lateral direction L. As mentioned above, the first burner 110 and the second burner 112 may be aligned with each other along the transverse direction T. In such embodiments, the first pogo pin terminal block 150 may be aligned with the first burner 110 along the transverse direction T and the second pogo pin terminal block 152 may be aligned with the second burner 112 along the transverse direction T. Thus, in some embodiments, the first burner 110 and the second burner 112 may be aligned with each other and with the first pogo pin terminal block 150 and the second pogo pin terminal block 152 along the transverse direction T.

The first pogo pin terminal block 150 and the second pogo pin terminal block 152 may each include at least three connectors, such as at least three spring loaded pins or at least three contact pads. For example, the first pogo pin terminal block 150 may include first connectors 154, e.g., three spring-loaded pins 154 in the illustrated example embodiment, and the second pogo pin terminal block 152 may include second connectors 156, e.g., a second set of three spring-loaded pins 156, where the illustrated spring-loaded pins are an example embodiment of first and second connectors 154 and 156 of the first and second pogo pin terminal blocks 150 and 152. In some embodiments, the first connectors 154 and the second connectors 156 may be positioned above the first burner 110 and the second burner 112 along the vertical direction V. In some embodiments, the first connectors 154 and the second connectors 156 may be positioned outside of, e.g., above along the vertical direction V, the recessed portion 108 of the panel 102. Thus, the connectors 154 and 156 may be protected from spillage, e.g., by positioning the connectors 154 and 156 above the recessed portion 108 of the panel 102 and/or by enclosing the connectors 154 and 156, where example embodiments of enclosing the connectors 154 and 156 will be described below.

The cooktop appliance 100 may also include a frame 200 which may be mounted, such as removably mounted, to the top surface 104 of the panel 102. The frame 200 may be configured to selectively support two or more grates 400, 402 (FIGS. 1 and 2) over the first burner 110 and the second burner 112.

The frame 200 may thusly be positioned above the first burner 110 and the second burner 112, e.g., along the vertical direction V. For instance, in some embodiments, the frame 200 may span the two burners 110 and 112, e.g., the frame 200 may consist of a single piece spanning unsupported across the first burner 110 and the second burner 112.

The frame 200 may include a first sleeve 222 which encloses the first connectors 154 of the first pogo pin terminal block 150 on four sides when the frame 200 is mounted to the top surface 104 of the panel 102 and a second sleeve 224 which encloses the second connectors 156 of the second pogo pin terminal block 152 on four sides when the frame 200 is mounted to the top surface 104 of the panel 102.

For example, the frame 200 may include or consist of four corners, and may have a leg extending generally along the vertical direction V at each corner. The sleeves 222 and 224 of the frame 200 may be positioned between the corners, e.g., between the legs. The legs of the frame 200 may be positioned on panel 102, e.g., may extend from an outer rail 202 of the frame 200 to the top surface 104 of panel 102 when the frame 200 is mounted on the panel 102. In some embodiments, the frame 200 may include a first leg 226 and a second 228 leg positioned opposite the first leg 226 along the transverse direction T. For example, the first leg 226 and the second leg 228 may be aligned with the first sleeve 222 along the transverse direction T with the first sleeve 222 positioned between the first leg 226 and the second leg 228. In some embodiments, the frame 200 may further include a third leg 230 and a fourth leg 232 positioned opposite the third leg 230 along the transverse direction T. For example, the third leg 230 and the fourth leg 232 may be aligned with the second sleeve 224 along the transverse direction T with the second sleeve 224 positioned between the third leg 230 and the fourth leg 232.

The first leg 226 and the second leg 228 may be disposed on the frame 200 opposite the third leg 230 and fourth leg 232 along the lateral direction L. In some embodiments, the frame 200 may span unsupported across the first burner 110 and the second burner 112, e.g., without any legs or other portions of the frame 200 resting on the panel 102 between the legs 226, 228, 230, and 232, and/or between the burners 110 and 112, along the lateral direction L. The first burner 110 and the second burner 112 may be positioned between the first leg 226 and the third leg 230 along the lateral direction L when the frame 200 is mounted to the top surface 104 of the panel 102. For example, the burners 110 and 112 may be between the first pair of legs, e.g., the first and second legs 226 and 228, and the second pair of legs, e.g., the third and fourth legs 230 and 232, along the lateral direction L.

As mentioned, the frame 200 may include an outer rail 202. The outer rail 202 of the frame may extend around a perimeter of the frame, such as completely around the entire perimeter of the frame 200 and may define a peripheral support surface 204, e.g., for at least partially supporting the grates 400, 402 thereon. For example, the peripheral support surface 204 may be configured to selectively support a first grate 400 on a first portion, e.g., half, of the peripheral support 204 surface and a second grate 402 on a second portion, e.g., a second half, of the peripheral support surface 204 adjacent to the first portion.

In some embodiments, the outer rail 202 of the frame 200 comprises a front portion 206, a left side portion 208, a back portion 210 parallel to the front portion 206, and a right side portion 212 parallel to the left side portion 208. The front portion 206 and the back portion 210 may be spaced apart by the left side portion 208 and the right side portion 212, e.g., the back portion 210 may be positioned at an opposite end of each of the left side portion 208 and the right side portion 212 from the front portion 206. The left side portion 208 and the right side portion 212 may each extend perpendicular to the front portion 206 and the back portion 210. For example, the left side portion 208 may extend from a left end 234 of the front portion 206 at a front end 236 of the left side portion 208 to a back end 238 of the left side portion 209. The back portion 210 may extend from the back end 238 of the left side portion 208 at a left end 240 of the back portion 210 to a back end 242 of the right side portion 212 at a right end 244 of the back portion 210. The right side portion 212 may extend from the back end 242 of the right side portion 212 to a front end 246 of the right side portion 212 at a right end 248 of the front portion 206.

The frame 200 may also include a crossbar 218 extending through the frame 200 at about the middle of the frame 200. For example, the crossbar 218 may extend from a midpoint 220 of the front portion 206 to a midpoint 219 of the back portion 210. In some embodiments, the peripheral support surface 204 may be defined along the front portion 206, the left side portion 208, the back portion 210, and the right side portion 212, and the crossbar 218 may define an intermediate support surface 221. The intermediate support surface 221 may be configured to selectively support the first grate 400 at a first side of the intermediate support surface 221 and the second grate 402 at a second side of the intermediate support surface 221.

The frame 200 may be formed of cast metal, such as cast iron or steel, such that the outer rail 202, cross-bar 218, legs 226, 228, 230, and 232, and sleeves 222 and 224 are formed from a single, seamless piece of metal. Frame 200 may be removable from panel 102, e.g., by lifting upwardly on the frame 200.

Moreover, it is understood that further additional or alternative embodiments of the frame 200 may be placed over only one burner or more than two burners.

As shown in FIGS. 1 and 2, in some embodiments, the cooktop appliance includes one or more grates, e.g., the frame 200 may be configured to receive and support a first and second selectively removable grates 400 and 402. Each grate 400 and 402 may extend at least partially above a corresponding burner 110, 112 when the grates 400 and 402 are in a mounted position on the frame 200 and the frame 200 is mounted on the panel 102. Generally, each grate 400, 402 is configured for supporting a cooking utensil, such as a pot, pan, etc., on top of the grate 400 and/or 402 when the grates 400 and 402 are in the mounted position on the frame 200.

For example, each grate 400 and 402 of the exemplary embodiment includes a plurality of fingers 404, e.g., formed of cast metal, such as cast iron. The cooking utensil may be placed on the fingers 404 of one of the grates 400 and 402 such that the cooking utensil rests on a top surface 468 of some or all of the fingers of the plurality of fingers 404. The first grate 400 may include a first outer frame 406 that extends around or defines a perimeter of the first grate 400. The second grate 402 may include a second outer frame 408 that extends around or defines a perimeter of the second grate 402. Thus, each outer frame 406, 408 may be disposed at an outer portion of the respective grate 400 or 402. The fingers 404 of each grate 400 and 402 may extend from the respective outer frame 406 or 408.

When mounted, the grates 400, 402 may selectively rest on the frame 200, such as on the peripheral support surface 204 and the intermediate support surface 221 thereof. For example, the first outer frame 406 may be supported by the left side portion 208, a left half of the front portion 206, a left half of the back portion 210, and a left side of the intermediate support surface 221. In such embodiments, the second outer frame 408 may be supported by the right side portion 212, a right half of the front portion 206, a right half of the back portion 210, and a right side of the intermediate support surface 221.

As shown, e.g., in FIG. 2, the grates 400 and 402 may be selectively removable (e.g., to an unmounted position), such that the grates 400 and 402 can be readily lifted from the frame 200.

The plurality of fingers 404 includes a first sensor finger 410 on the first grate 400 and a second sensor finger 412 on the second grate 402. Sensor fingers 410 and 412 each support a temperature sensor 450 that is operable to measure a temperature of a cooking utensil on the respective grate 400 or 402. The first sensor finger 410 is illustrated in FIGS. 7 through 11 and it should be understood that the second sensor finger 412 provides the same or similar, e.g., mirrored, features as those shown and described for first sensor finger 410. As may be seen in FIGS. 7 through 11, the first sensor finger 410 defines a slot 414 at a bottom surface 416 of the sensor finger 410. Each slot 414 is open and faces downward, e.g., along the vertical direction V, such as towards the panel 102 when the grate 400 is in the mounted position on the panel 102. Thus, slot 414 is exposed and accessible at the bottom surface 416 of each sensor finger 410, 412.

As best seen in FIGS. 7 through 11, the sensor finger 410 extends between a first end 418 and a second end 420. In some embodiments, sensor finger 410 may be elongated between the first and second ends 418, 420 of sensor finger 410. Second end 420 of sensor finger 410 may be positioned at the outer frame 406 of the grate 402. Conversely, first end 418 of sensor finger 410 may be spaced from the outer frame 406, and may be positioned above the corresponding gas burner 110 or 112 when the grate 400 or 402 is mounted on the frame 200, e.g., as illustrated in FIG. 6. Slot 414 may also extend between a first end 422 and a second end 424. First end 422 of slot 414 may be positioned at first end 418 of sensor finger 410, and second end 424 of slot 414 may be positioned at second end 420 of sensor finger 410. Thus, slot 414 may extend along the length of sensor finger 410.

Figure 8:
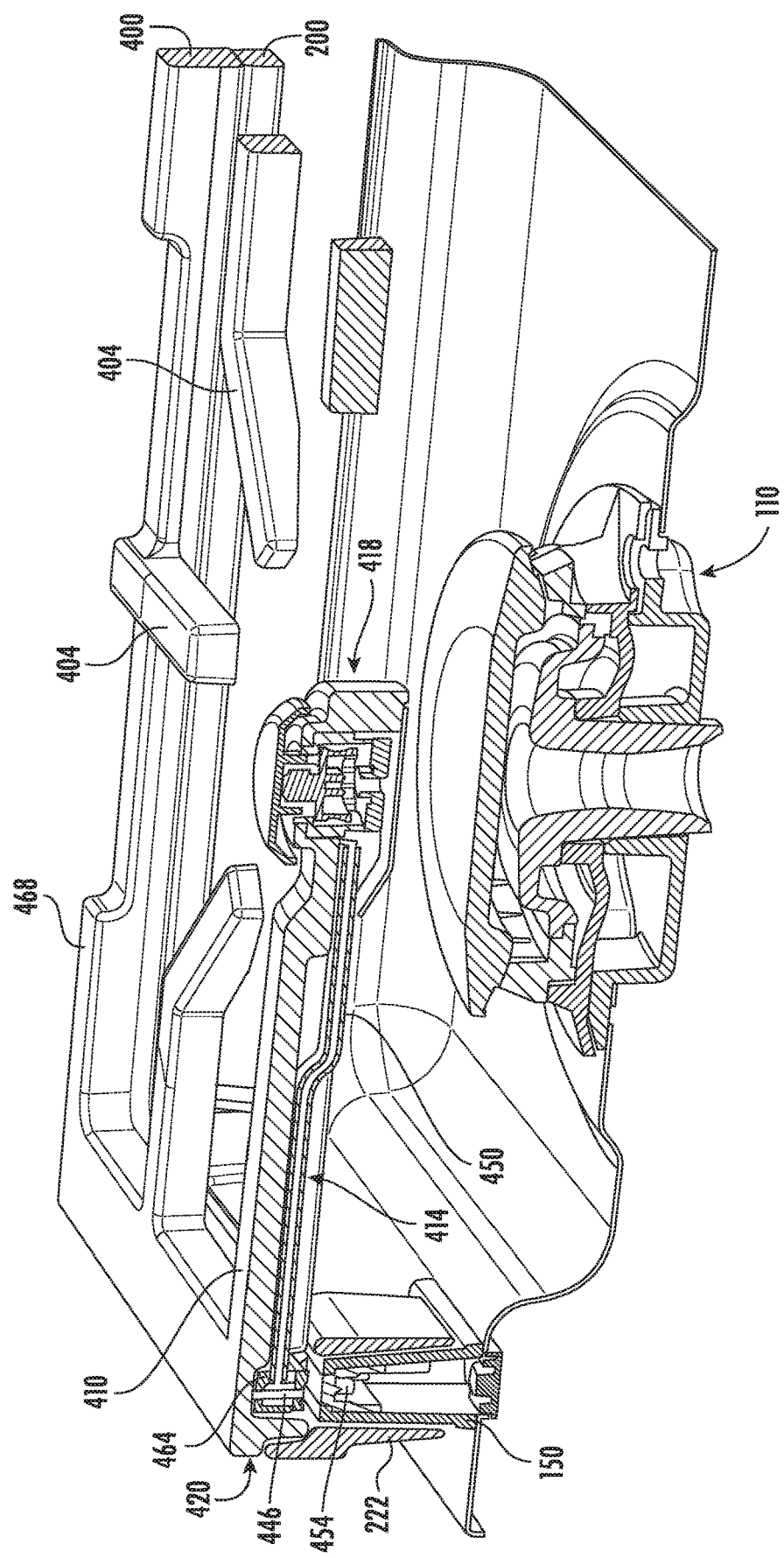
FIG. 8 provides a section view of a portion of the example cooktop appliance of FIG. 1.
Figure 9:
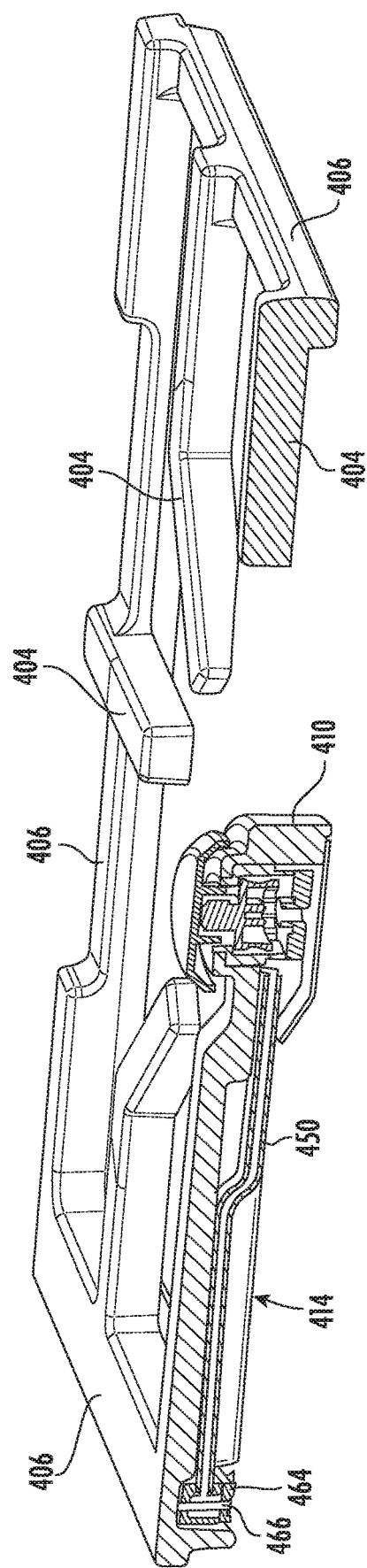
FIG. 9 provides a section view of the grate of FIG. 7.

Temperature sensor 450 is mounted to sensor finger 410, e.g., within the slot 414 as mentioned above. For example, temperature sensor 450 may include a first temperature probe 452 positioned at first end 418 of sensor finger 410 and/or first end 422 of slot 414 and a second temperature probe 453 positioned within the sensor finger 410. In some embodiments, e.g., as illustrated in FIG. 8, the first temperature probe 452 may be positioned over gas burner 110 on sensor finger 410. In particular, first temperature probe 452 may be directly above, e.g., along the vertical direction, the burner 110, and/or may be positioned concentric with gas burner 110 on sensor finger 410. As mentioned, each finger of the plurality of fingers 404, including the sensor fingers 410 and 412, may include a top surface 468. The second temperature probe 453 may be positioned between the top surface 468 of the sensor finger 410 and the bottom surface 416 of the sensor finger. The first temperature probe 452 may extend above the top surface 468 of the sensor finger 410 in order to contact a cooking utensil on the top surface 468, as will be described in more detail below. The first temperature probe 452 and the second temperature probe 453 may each be or include a resistance temperature detector, a thermocouple, an infrared temperature sensor, a bimetallic switch, etc.

As may be seen, e.g., in FIGS. 10 through 13, the temperature sensor 450 may include a top cap 454 above the first temperature probe 452. In particular, the first temperature probe 452 may be in direct contact with the top cap 454 such that the first temperature probe 452 is in direct conductive thermal communication with the top cap 454. The first temperature probe 452 may be at least partially thermally insulated from the grate 400, e.g., the metal of the sensor finger 410, and the burner 110. For example, the first temperature probe 452 may be disposed within a thermally insulative sensor body 472, e.g., the sensor body 472 may include a thermally insulative material, such as a ceramic material. The sensor body 472 may be received within a bushing 474 and a bottom insulator 476 may be positioned below the sensor body 472 and the bushing 474. Similar to the sensor body 472, the bushing 474 and the bottom insulator 476 may each also include thermally insulative material, such as a ceramic material. The bottom insulator 476 and the bushing 474 may be joined together by a bottom cap 478. For example, the bottom cap 478 may provide a press fit or interference fit with, e.g., the bushing 474. In some embodiments, the bottom cap 478 may be pressed on and/or may be crimped.

In some embodiments, the temperature sensor 450 may further include a heat transfer cap 456. The first temperature probe 452 may be positioned within the sensor body 472 with the heat transfer cap 456 over the first temperature probe 452. For example, the heat transfer cap 456 may be placed above the first temperature probe 452 along the vertical direction V. In some embodiments, the heat transfer cap 456 may be in conductive thermal communication with the first temperature probe 452. For example, the heat transfer cap 456 may be in direct contact with the top cap 454, which is in turn in direct contact with the first temperature probe 452, such that the heat transfer cap 456 is in conductive thermal communication with the first temperature probe 452 via the top cap 454. The heat transfer cap 456 may be removably mounted on the top cap 454. For example, the heat transfer cap 456 may be threadedly connected to the top cap 454, e.g., as illustrated in FIGS. 8-10 and 13, where the top cap 454 includes external threads and the heat transfer cap 456 includes mating internal threads which engage the external threads of the top cap 454. The heat transfer cap 456 may have a larger diameter than the first temperature probe 452 and the top cap 454 in order to prevent or minimize spilled material contaminating the temperature sensor 450, such as the probe 452 or other internal components thereof. Also, when the heat transfer cap 456 is removably connected to the top cap 454 as described, the heat transfer cap 456 may be easily removed for cleaning and easily replaced after cleaning.

Figure 10:
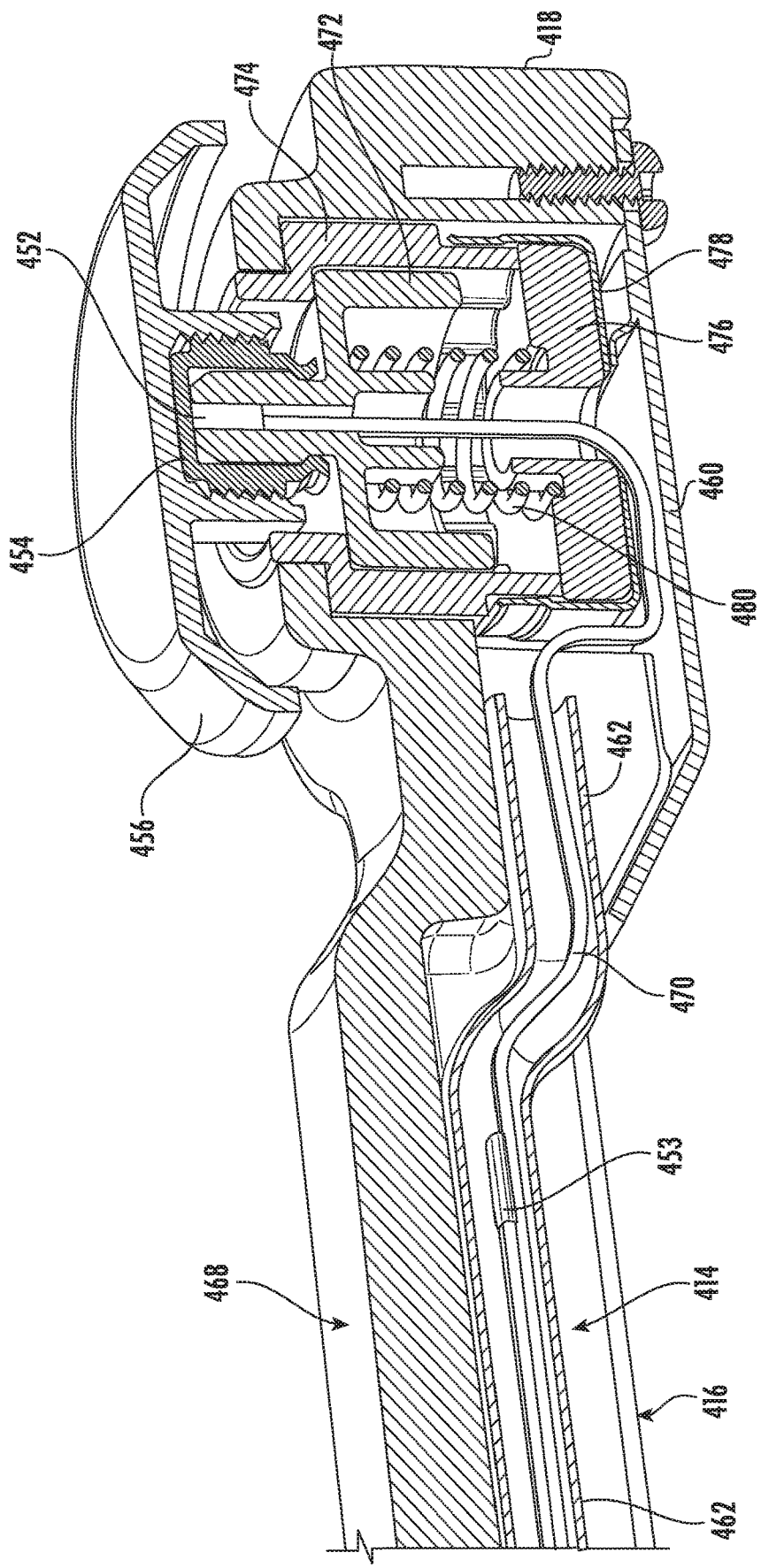
FIG. 10 provides an enlarged section view of a portion of the grate of FIG. 9.

The first temperature probe 452 may be coupled to or in operative communication with a biasing member or spring 480, such that the first temperature probe 452 is urged upwardly, e.g., towards a utensil positioned on the grate 400, by the spring 480. For example, as illustrated in FIG. 10, the spring 480 may be coupled to a flange on the sensor body 472 such that the spring 480 biases the sensor body 472 with the first temperature probe 452 therein, upwards towards the top surface 468 of the sensor finger 410. The spring 480 may bias the first temperature probe 452 upward such that the first temperature probe 452 is positioned at least partially above the top surface 468, e.g., such that the first temperature probe 452 extends above the top surface 468. Thus, first temperature probe 452 may be positioned on sensor finger 410 such that first temperature probe 452 is configured to contact a cooking utensil, or be in conductive thermal communication with the cooking utensil via the top cap 454 and in some embodiments the heat transfer cap 456, such that the first temperature probe 452 is operable to measure and/or detect the temperature of the cooking utensil on the grate 400 when the cooking utensil is heated by the corresponding gas burner 110.

A cover 460 may also be mounted to the sensor finger 410 within the slot 414 or adjoining the slot 414 at the bottom surface 416 of sensor finger 410. Cover 460 may be positioned between the first temperature probe 452 and gas burner 110, e.g., along the vertical direction V. Thus, cover 460 may advantageously shield first temperature probe 452 from direct heating by gas burner 110, and the bottom insulator 476 may provide further insulation of the probe 452 from direct heating by the gas burner 110. For example, cover 460 and bottom insulator 476 may block direct radiative heat transfer from surfaces at gas burner 110 to the first temperature probe 452, and/or cover 460 and bottom insulator 476 may shield the first temperature probe 452 from direct convective heat transfer from air heated by gas burner 110.

A tubular sheath 462 is positioned within slot 414, and tubular sheath 462 may extend between probe 452 and a base 464 of the temperature sensor 450. Tubular sheath 462 may be a metal tubular sheath, such as an aluminum, copper, steel, or other suitable tube, such as a ceramic tube.

A wire 470 extends through tubular sheath 462 between the first temperature probe 452 and the base 464. The second temperature probe 453 may be positioned at an intermediate location along the wire 470 between the first temperature probe 452 and the base 464. The base 464 may be or include a pogo pin terminal block, e.g., the base 464 of the first temperature sensor 450 embedded in the first grate 400 may be or provide a third pogo pin terminal block, and the base 464 of the second temperature sensor 450 embedded in the second grate 402 may be or provide a fourth pogo pin terminal block, where the third and fourth pogo pin terminal blocks on the grates may be connectable with the first pogo pin terminal block 150 and the second pogo pin terminal block 152 on the top panel 102. Wire 470 connects the first and second probes 452 and 453 with the pogo pin connectors on the base 464 to place the first and second probes 452 and 453 and base 464 in signal communication with each other. Thus, wire 470 may transmit electrical signals between probes 452/453 and base 464, such as a pogo pin terminal block and/or pogo pin connectors of the base 464. Wire 470 may include a woven fiberglass jacket or a woven steel mesh jacket. Such construction of wire 470 may advantageously limit conductive heat transfer between tubular sheath 462 and wire 470. Thus, wire 470 within tubular sheath 462 may be insulated for high temperatures.

The base 464 of the temperature sensor 450 may be positioned at or within the second end 420 of the slot 414. Thus, the temperature sensor 450 may extend within the slot 414 from the base 464 at the second end 420 of the slot 414 to the probe 452 at the first end 418 of the slot 414, whereby the temperature sensor 450 may be embedded within the grate 400, e.g., within the slot 414 of the grate 400. As mentioned, the base 464 may include a pogo pin terminal block having pogo pin connectors, e.g., contact pads or spring-loaded pins, for example, the base 464 may include three contact pads 466 for connecting with spring-loaded pins 154 of the first pogo pin terminal block 150 or the spring-loaded pins 156 of the second pogo pin terminal block 152 when the grate 400 is mounted on the frame 200 and the frame 200 is mounted on the panel 102. In alternative example embodiments, the relative position of spring loaded pins and contact pads on first and second pogo pin terminal blocks 150, 152 and the base 464 of the temperature sensor 450 may be reversed.

Such construction of the sensor finger 410 and temperature sensor 450 provides numerous advantages. For example, temperature sensor 450 is advantageously positioned proximate a cooking utensil on the grate 400 yet temperature sensor 450 and wire 470 are also shielded by sensor finger 410 and tubular sheath 462 from direct convective heating from gas burner 110. As another example, providing pogo pin terminal blocks, e.g., the base 464 of the or each temperature sensor 450 having pogo pin connectors thereon, also allows grates 400 and 402 to be removed from the panel 102 without the need to manually disconnect any wiring. Such pogo pin connections may also accommodate variation in positioning of grates 400 and 402 on panel 102 while also maintaining good electrical signal. The foregoing advantages are described by way of example only and without limitation. Additional advantages of the present disclosure may also be apparent to those of ordinary skill in the art.

As mentioned above, the cooktop appliance 100 may include a controller 130 and the first and second grates 400 and 402 may include first and second sensor fingers 410 and 412, respectively, with each having a temperature sensor 450 embedded therein. The temperature sensor(s) 450 may be selectively in operative communication with the controller 130, e.g., may be in operative communication with the controller 130 via a connection between the first and second pogo pin terminal blocks 150 and 152 on the panel 102 and respective pogo pin connectors on each of the grates 400 and 402 when the grates 400 and 402 are mounted on the frame 200 while the frame 200 is mounted on the panel 102.

Figure 14:
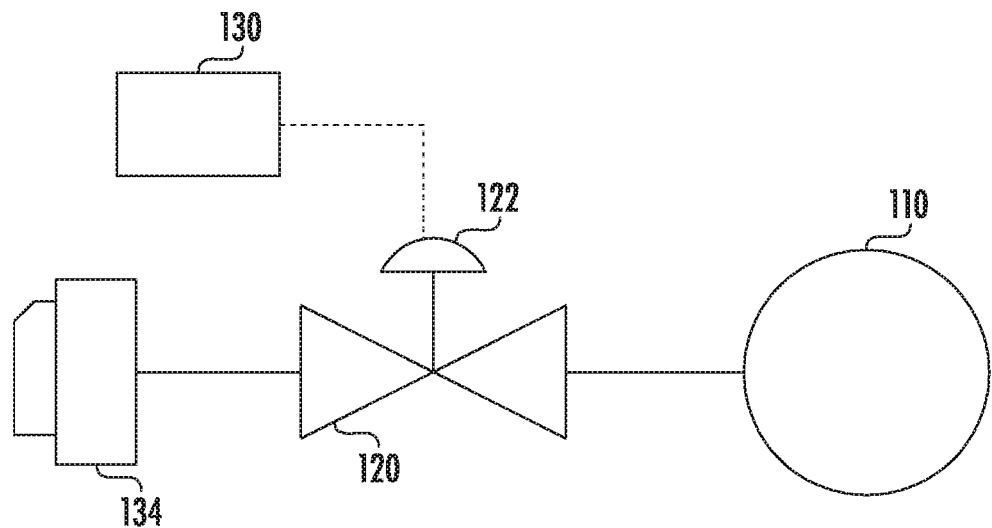
FIG. 14 provides a diagrammatic illustration of a control valve as may be incorporated into a cooktop appliance in one or more example embodiments of the present disclosure.

FIG. 14 is a schematic view of certain components of cooktop appliance 100 according to one or more embodiments of the present disclosure. In particular, as shown in FIG. 14, the cooktop appliance 100 may include a control valve 120. The control valve 120 may be connected to a fuel supply via a fuel supply line, e.g., a metal tube, such as copper or aluminum tubing. Thus, the supply line may receive a flow of pressurized gaseous fuel, e.g., natural gas or propane, from the fuel supply and the flow of fuel through the supply line to the burner 110 may be regulated, e.g., permitted or at least partially obstructed, by the control valve 120. In particular embodiments, e.g., as illustrated in FIG. 14, the control valve 120 may be a mechanically actuated control valve. For example, as shown in FIG. 14, the control valve 120 may be coupled to one of the user inputs 134, such as the exemplary knob 134 illustrated in FIG. 14, which is an embodiment of a user input, such that control valve 120 is manually adjustable to regulate the flow of gaseous fuel to burner 110. For example, a user may rotate the knob 134 coupled to control valve 120 to a high setting (sometimes stylized as "HI") in order to maximize the flow of gaseous fuel to burner 110, and the user may rotate the knob 134 coupled to control valve 120 to a low setting (sometimes stylized as "LO") in order to minimize the flow of gaseous fuel to burner 110. In addition, the user may rotate the knob 134 to a setting between the "HI" and "LO" settings to adjust the flow of gaseous fuel to burner 110 between the maximum and minimum flows, or the user may rotate the knob 134 coupled to control valve 120 to an "OFF" setting in order to terminate the flow of gaseous fuel to burner 110. Thus, it will be understood that control valve 120 may be a standard manual surface burner valve, in certain example embodiments. In such embodiments, the cooktop appliance 100 may further include a position sensor 122 coupled to the control valve 120. The position sensor 122 may also be communicatively coupled to the controller 130, whereby the position sensor 122 may transmit a signal to the controller 130 which is indicative of the position of the valve 120 and thereby also indicative of the power setting defined by the user input 134.

Figure 15:
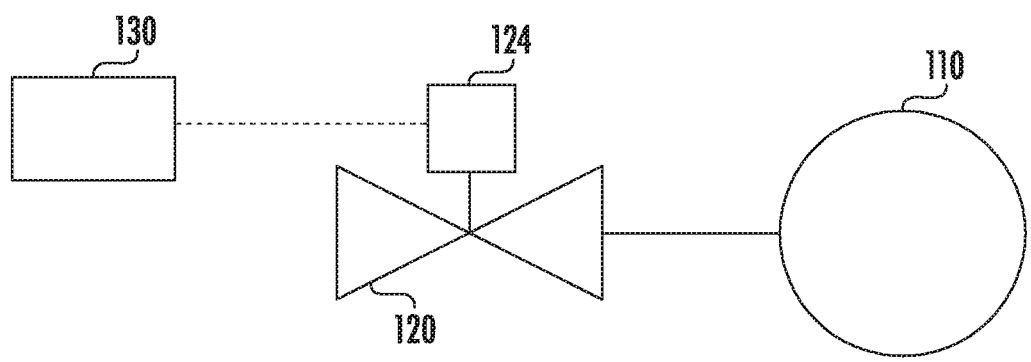
FIG. 15 provides a diagrammatic illustration of a control valve as may be incorporated into a cooktop appliance in one or more example embodiments of the present disclosure.

In additional embodiments, e.g., as illustrated in FIG. 15, the control valve 120 may be an electronically actuated valve, such as an electronic pressure regulating valve, a motorized valve, a modulating valve, a solenoid valve, or some other variable type gas flow valve. Thus, control valve 120 may, in such embodiments, be automatically adjusted to regulate the flow of gaseous fuel to burner 110, e.g., rather than being manually actuated as in the embodiment illustrated by FIG. 14. In particular, in embodiments where the control valve 120 is electronically actuated, such as the exemplary embodiment of FIG. 15, the controller 130 may be in operative communication with the control valve 120, and/or an electronic actuator 124, such as a stepper motor or solenoid, coupled to the control valve 120. Thus, in such embodiments, the controller 130 may receive a signal from the user input 134, and the controller 130 may then adjust the control valve 120 with the electronic actuator 124 in order to regulate the flow of gaseous fuel to burner 110 corresponding to the signal from the user input 134. The user input 134 may be a knob, e.g., as illustrated in FIG. 1, and may also or instead be or include a button, touchpad, touchscreen, and/or other suitable user input. In various embodiments, the user input 134 may be located on the user interface panel 132 and/or may be part of a remote user interface device such as a smartphone or smart home system.

As mentioned, the controller 130 may be configured and operable to perform certain method steps. For example, the controller 130 may be in operative communication with and/or configured to communicate with the first temperature probe 452 and the second temperature probe 453 of the temperature sensor 450, e.g., the controller 130 may transmit signals to and/or receive signals from the first temperature probe 452 and the second temperature probe 453 of the temperature sensor 450, e.g., via the pogo pin connection described above. Accordingly, in some embodiments, the temperature sensor 450 may be configured to transmit a first temperature measurement from the first temperature probe 452 and a second temperature measurement from the second temperature probe 453 to the controller 130. In such embodiments, the controller 130 may be configured to determine a temperature of a cooking utensil positioned on the top surface 468 of the sensor finger 410 based on a power setting defined by the user input 134, the first temperature measurement and the second temperature measurement.

The first temperature measurement may represent a temperature measurement of the cooking utensil, e.g., where the first temperature probe 452 is in conductive thermal communication with the cooking utensil via the top cap 454 and, in some embodiments, the heat transfer cap 456. However, the first temperature measurement alone may not accurately reflect the temperature of the cooking utensil due to heat from the grate 400, e.g., the sensor finger 410, and the burner 110 influencing the first temperature measurement. The second temperature measurement may correspond to the temperature of the grate 400, such that the influence of the temperature of the grate 400 on the first temperature measurement may be at least partially corrected for and/or factored out based on the second temperature measurement. For example, the second temperature probe 453 may be located close to the exterior of the temperature sensor 450 in order to measure the temperature of the sensor finger 410. Further, the influence of the temperature of the grate 400 on the first temperature measurement generally increases when the power level, e.g., output setting, of the burner 110 changes and/or over time as the grate 400 heats up, which may also introduce a transient error into the calculation or determination of the cooking utensil temperature. For example, the transient error may occur during or correspond to an initial portion of a cooking operation when the system, e.g., the burner 110, the grate 400 above the burner 110, and the cooking utensil on the grate 400, is increasing in temperature from, e.g., room temperature or other relatively cool temperature, to an operating temperature, such as about 150° F. or greater. As another example, the transient error may occur after or correspond to a change in the power level of the burner 110, e.g., from "OFF" to any other setting as in the previous example, or from high to low or medium, from low to medium or high, or between levels within a number of continuously variable levels.

When the determination of the temperature of the cooking utensil is at least in part based on the power setting, an extra degree of freedom (e.g., as compared to using one or both of the first and second temperature measurements from the first and/or second temperature probes 452 and 453) is introduced to the algorithms used to predict the cooking utensil temperature. Such embodiments may provide a transient correction factor which may avoid or reduce transient errors, such as those described above.

In various example embodiments, the power setting may correspond to or be indicated by a position of the control valve 120. For example, the power setting defined by the user input may correspond to a position of a knob 134 (FIG. 14) coupled, e.g., mechanically coupled, to a control valve 120, and/or may correspond to a signal from a user input such as a touchpad or touchscreen, e.g., in embodiments where the control valve 120 is electronically actuated. In some exemplary embodiments, the control valve 120 may be a mechanically actuated control valve 120, as described above, e.g., including a valve position sensor 122 configured to detect a position of the control valve 120. In such embodiments, the controller 130 may be in communication with the valve position sensor 122, and the controller 130 may be configured to determine the power setting defined by the user input 134 based on the detected position of the mechanically actuated control valve 120. In other exemplary embodiments, the control valve 120 may also or instead be electronically actuated. In embodiments including the electronically actuated control valve 120, the controller 130 may be in communication with the electronically actuated control valve 120, e.g., via an electronic actuator 124 (FIG. 15), and the controller 130 may be configured to determine the power setting defined by the user input based 134 on a position of the electronically actuated control valve 120, e.g., as determined by a status of the electronic actuator 124, such as, in embodiments where the electronic actuator 124 includes a stepper motor, a position of the stepper motor.

In some embodiments, the controller 130 may be configured to receive a valve position input corresponding to a position of the control valve 120 which is in fluid communication with the gas burner 110. For example, the valve position input may be in continuous form, such as in embodiments where the control valve 120 is selectively positionable at one of a number of continuously variable levels. As another example, the valve position input may include at least three discrete levels, e.g., off, low, and high, such as off, low, medium, and high, etc.

Figure 16:
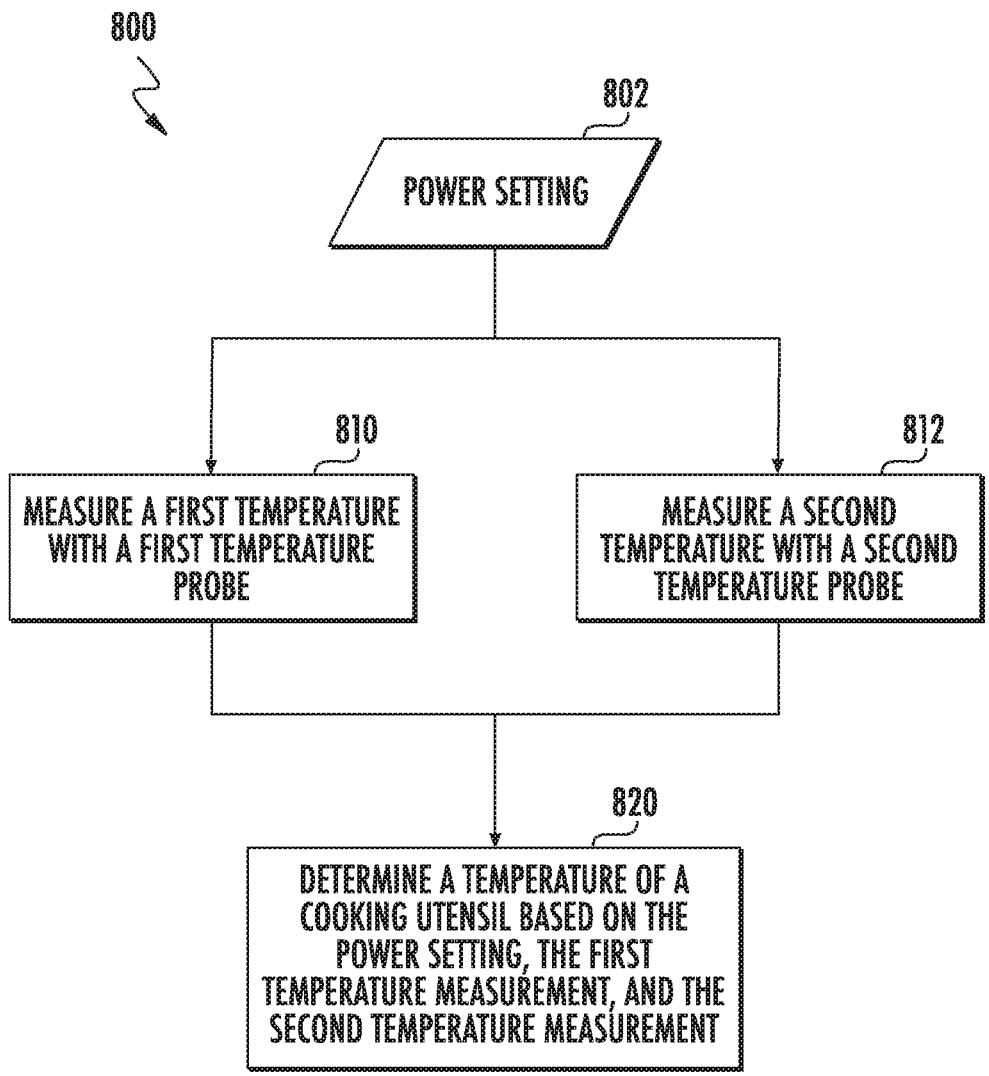
FIG. 16 provides a flow diagram of an exemplary method according to one or more example embodiments of the present disclosure.

As illustrated in FIG. 16, embodiments of the present disclosure also include one or more exemplary methods of measuring a temperature of a cooking utensil on a cooktop appliance, such as the exemplary cooktop appliance 100. For example, the method may include measuring a temperature of a cooking utensil on a cooktop appliance which includes a gas burner 110, a grate 400, and a temperature sensor 450 mounted to a sensor finger 410 (and/or 412), as described above. An example method 800 of measuring a temperature of a cooking utensil on a cooktop appliance is illustrated in FIG. 16. As illustrated in FIG. 16, the example method 800 may include, at 802, receiving a power setting for the gas burner from a user input of the cooktop appliance. The power setting may be received directly from the user input, such as in exemplary embodiments where the user input is in direct communication with a controller and the controller adjusts the position of a control valve via an electronic actuator. The power setting may be indirectly received, such as via a position sensor coupled to a manually or mechanically actuated control valve.

Also as may be seen in FIG. 16, the example method 800 may include steps 810 and 812 of measuring a first temperature with a first temperature probe and measuring a second temperature with a second temperature probe. For example, the first temperature probe may be positioned and configured to measure a temperature of the cooking utensil, e.g., such as the first temperature probe 452 described above. Also by way of example, the second temperature probe may be positioned and configured to measure a background temperature which influences, e.g., contributes to error or deviation in, the first temperature measurement relative to the actual temperature of the cooking utensil, such as the grate temperature sensing second temperature probe 453 described above.

The method 800 may then include a step 820 of determining the temperature of the cooking utensil based on the power setting, the first temperature measurement and the second temperature measurement. In various embodiments, the power setting may be received from a valve position sensor configured to detect a position of a mechanically actuated control valve and/or may be received directly from the user input, e.g., when the control valve is electronically actuated.

The cooktop appliance 100 shown in FIGS. 1 through 15 illustrates various example embodiments of the present disclosure. Thus, although described in the context of cooktop appliance 100, the present disclosure may be used in cooktop appliances having other configurations, e.g., a cooktop appliance with fewer burner assemblies or additional burner assemblies. Similarly, the present disclosure may be used in cooktop appliances that include an oven, i.e., range appliances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
    a gas burner disposed on a panel of the cooktop appliance;
    a user input configured to define a power setting of the gas burner;
    a grate with a plurality of fingers positioned above the gas burner, the plurality of fingers including a sensor finger;
    a temperature sensor mounted to the sensor finger of the plurality of fingers of the grate, the temperature sensor comprising a first temperature probe extending above a top surface of the sensor finger at a first end portion of the sensor finger and a second temperature probe positioned within the sensor finger between the top surface of the sensor finger and a bottom surface of the sensor finger; and
    a controller in communication with the temperature sensor, wherein the temperature sensor is configured to transmit a first temperature measurement from the first temperature probe and a second temperature measurement from the second temperature probe to the controller, and the controller is configured to determine a temperature of a cooking utensil positioned on the top surface of the sensor finger based on the power setting defined by the user input, the first temperature measurement, and the second temperature measurement.

2. The cooktop appliance of claim 1, further comprising a mechanically actuated control valve in fluid communication with the gas burner to selectively direct a flow of gas to the gas burner and a valve position sensor configured to detect a position of the control valve, wherein the controller is in communication with the valve position sensor and the controller is configured to determine the power setting defined by the user input based on the detected position of the mechanically actuated control valve.

3. The cooktop appliance of claim 1, further comprising an electronically actuated control valve in fluid communication with the gas burner to selectively direct a flow of gas to the gas burner, wherein the controller is in communication with the electronically actuated control valve and the controller is configured to determine the power setting defined by the user input based on a position of the electronically actuated control valve.

4. The cooktop appliance of claim 1, wherein the controller is configured to receive a valve position input corresponding to a position of a control valve in fluid communication with the gas burner.

5. The cooktop appliance of claim 4, wherein the valve position input is in continuous form.

6. The cooktop appliance of claim 4, wherein the valve position input comprises at least three discrete levels.

7. The cooktop appliance of claim 1, wherein the controller is in communication with the temperature sensor via a pogo pin connection, the pogo pin connection comprising a first pogo pin terminal block positioned on the panel and a second pogo pin terminal block mounted to the sensor finger.

8. The cooktop appliance of claim 7, wherein each of the first and second pogo pin terminal blocks comprises a respective one of at least three spring loaded pins and at least three contact pads.

9. The cooktop appliance of claim 1, wherein the sensor finger defines an open downward facing slot which opens into the bottom surface of the sensor finger, and wherein the temperature sensor is mounted to the sensor finger within the slot.

10. The cooktop appliance of claim 9, further comprising a tubular sheath positioned within the slot, the tubular sheath extending between the first temperature probe and a pogo pin terminal block mounted to the sensor finger, and a wire extending through the tubular sheath between the first temperature probe and the pogo pin terminal block mounted to the sensor finger.

11. The cooktop appliance of claim 9, wherein the first temperature probe is positioned at a first end of the slot and the pogo pin terminal block is positioned at a second end of the slot.

12. The cooktop appliance of claim 1, further comprising a frame removably mounted to a top surface of the panel, wherein the frame is configured to removably support the grate over the gas burner.

13. The cooktop appliance of claim 12, further comprising a pogo pin terminal block positioned on the panel, wherein the frame comprises a sleeve which encloses connectors of the pogo pin terminal block positioned on the panel on four sides when the frame is mounted to the top surface of the panel.

14. The cooktop appliance of claim 1, wherein the first temperature sensor is concentric with the gas burner.

15. The cooktop appliance of claim 1, wherein the first temperature sensor is positioned directly over the gas burner.

16. A method of measuring a temperature of a cooking utensil on a cooktop appliance, the cooktop appliance comprising a gas burner disposed on a panel of the cooktop appliance, a grate with a plurality of fingers positioned above the gas burner, the plurality of fingers including a sensor finger, and a temperature sensor mounted to the sensor finger of the plurality of fingers of the grate, the temperature sensor comprising a first temperature probe extending above a top surface of the sensor finger at a first end portion of the sensor finger and a second temperature probe positioned within the sensor finger between the top surface of the sensor finger and a bottom surface of the sensor finger, the cooking utensil positioned on the top surface of the sensor finger, the method comprising:
- receiving a power setting for the gas burner from a user input of the cooktop appliance;
- measuring a first temperature with the first temperature probe;
- measuring a second temperature with the second temperature probe; and
- determining the temperature of the cooking utensil based on the power setting, the first temperature measurement, and the second temperature measurement.

17. The method of claim 16, wherein the power setting is received from a valve position sensor configured to detect a position of a mechanically actuated control valve in fluid communication with the gas burner to selectively direct a flow of gas to the gas burner.

18. The method of claim 16, wherein the cooktop appliance further comprises an electronically actuated control valve in fluid communication with the gas burner to selectively direct a flow of gas to the gas burner, wherein the power setting is received directly from the user input.

* * * * *